United States Patent
Zhu

(10) Patent No.: US 9,456,378 B2
(45) Date of Patent: Sep. 27, 2016

(54) END-TO-END (E2E) TUNNELING FOR MULTI-RADIO ACCESS TECHNOLOGY (MULTI-RAT)

(71) Applicant: INTEL CORPORATION, Santa Clara, CA (US)

(72) Inventor: Jing Zhu, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 210 days.

(21) Appl. No.: 14/125,601

(22) PCT Filed: Sep. 25, 2013

(86) PCT No.: PCT/US2013/061573
§ 371 (c)(1),
(2) Date: Dec. 12, 2013

(87) PCT Pub. No.: WO2015/047237
PCT Pub. Date: Apr. 2, 2015

(65) Prior Publication Data
US 2015/0181459 A1    Jun. 25, 2015

(51) Int. Cl.
*H04W 28/02* (2009.01)
*H04L 29/06* (2006.01)
*H04L 12/851* (2013.01)
(Continued)

(52) U.S. Cl.
CPC ...... *H04W 28/0268* (2013.01); *H04L 12/4633* (2013.01); *H04L 29/06523* (2013.01); *H04L 47/24* (2013.01); *H04L 47/825* (2013.01); *H04L 69/22* (2013.01); *H04W 28/0289* (2013.01); *H04W 28/16* (2013.01); *H04W 76/00* (2013.01); *H04W 76/022* (2013.01); *H04W 28/08* (2013.01)

(58) Field of Classification Search
None
See application file for complete search history.

(56) References Cited

U.S. PATENT DOCUMENTS

2002/0136162 A1 *  9/2002  Yoshimura ............ H04L 29/06
                                                    370/229
2007/0026861 A1    2/2007  Kuhn et al.
(Continued)

FOREIGN PATENT DOCUMENTS

KR    10-2009-0013568 A    2/2009

OTHER PUBLICATIONS

Tsirtsis et al., "Flow Bindings in Mobile IPv6 and Network Mobility (NEMO) Basic Support", Request for Comments: 6089, Internet Engineering Task Force (IETF), Standards Track, Jan. 2011, 31 Pages.

(Continued)

*Primary Examiner* — Ashley Shivers
(74) *Attorney, Agent, or Firm* — Thorpe North & Western LLP

(57) ABSTRACT

Technology for measuring quality of service (QoS) in a tunneling layer using multiple radio access technologies (RAT) is disclosed. In an example, a mobile node (e.g., user equipment UE), a mobile station (MS), or a mobile cheat), or a multi-RAT control server and/or gateway can include computer circuitry configured to: receive packets of a data flow from separate tunnel connections; and generate a QoS metric for the data flow from a QoS parameter within an enhanced tunneling header of a received packet. At least one RAT (e.g., third generation partnership project (3GPP) long term evolution (LTE), Institute of Electrical and Electronics Engineers (IEEE) 802.16 or Worldwide interoperability for Microwave Access (WiMAX), or IEEE 802.11 or Wireless Fidelity (WiFi)) can communicate via the tunnel connections.

27 Claims, 10 Drawing Sheets

(51) Int. Cl.
   *H04L 12/46*   (2006.01)
   *H04L 12/911*  (2013.01)
   *H04W 28/16*   (2009.01)
   *H04W 76/00*   (2009.01)
   *H04W 76/02*   (2009.01)
   *H04W 28/08*   (2009.01)

(56) References Cited

U.S. PATENT DOCUMENTS

| | | |
|---|---|---|
| 2007/0070937 A1 | 3/2007 | Demirhan et al. |
| 2007/0070958 A1* | 3/2007 | Rinne ................... H04W 12/06 370/338 |
| 2008/0212591 A1 | 9/2008 | Wu et al. |
| 2011/0267948 A1 | 11/2011 | Koc et al. |
| 2012/0063402 A1* | 3/2012 | Arvidsson ......... H04W 72/1242 370/329 |
| 2012/0082096 A1* | 4/2012 | Cave ..................... H04L 1/1841 370/328 |
| 2013/0326631 A1* | 12/2013 | Cartmell ............... H04L 63/306 726/26 |
| 2014/0036999 A1* | 2/2014 | Ryu ....................... H04N 19/50 375/240.12 |

OTHER PUBLICATIONS

Strauss et al., "A Measurement Study of Available Bandwidth Estimation Tools", Proceedings of the 3rd ACM SIGCOMM Conference on Internet measurement, Oct. 2003, 6 Pages.

International Search Report and Written Opinion received for PCT Patent Application No. PCT/US2013/061573, mailed on Jun. 26, 2014, 14 pages.

Wakikawa et al., "Multiple Care-of Addresses Registration", Request for Comments: 5648, Network Working Group, Standards Track, Oct. 2009, 36 Pages.

\* cited by examiner

| Communication Layers 458 | LTE Layers 478 | |
|---|---|---|
| Application Layer 470 | Video Audio Speech Timed Text 494 | Media Presentation Description (MPD) 490 |
| | 3GPP File Format 492 | |
| Session Layer 468 | HTTP 488 | |
| Transport Layer 466 | TCP/UDP/Tunneling 486 | |
| Network Layer 464 | IP 484 | |
| Link Layer 462 | MAC/RRC 482 | |
| Physical Layer 460 | PHY 480 | |

FIG. 2

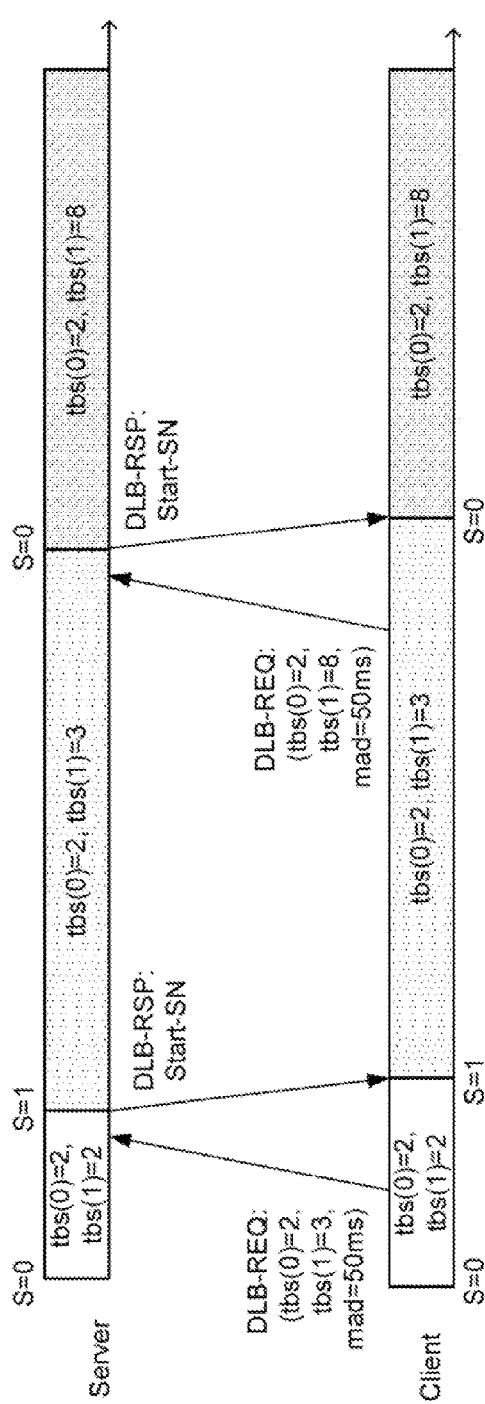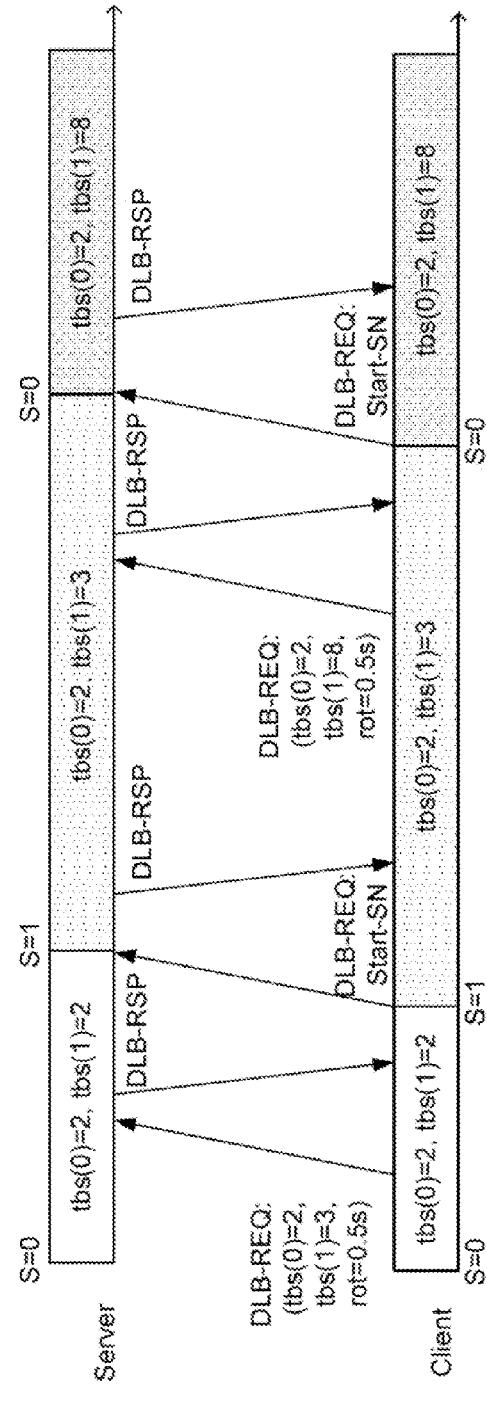

END-TO-END (E2E) TUNNELING FOR MULTI-RADIO ACCESS TECHNOLOGY (MULTI-RAT)

BACKGROUND

Wireless mobile communication technology uses various standards and protocols to transmit data between a node (e.g., a transmission station) and a wireless device (e.g., a mobile device) Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE) (e.g., Release 11 or V11.3.0dated 06-2013), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard (e.g., 803.11ac, 802.11ad), which is commonly known to industry groups as WiFi (Wireless Fidelity).

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

Wireless devices can include mobile communication technology to communicate using multiple radio access technologies, such as LTE, WiMax, or WiFi. For example, in some configurations, the wireless devices may include a radio to communicate using LTE protocols via an eNB and a radio to communicate using a WiFi protocols via a wireless access point (WAP). In other configurations, wireless devices can include a single radio to communicate with both the eNB and the WAP.

When a wireless device (e.g., mobile node) can simultaneously access both a wireless local area network (WLAN) (e.g., Wi-Fi) and a wide wireless area network (WWAN) (e.g., second generation/third generation (2G/3G) cellular, LTE, or WiMAX), the wireless device can select a network for an Internet Protocol (IP) packet flow (e.g., an IP flow mobility technique).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 2 illustrates a diagram of communication layers in accordance with an example;

FIG. 6A illustrates a diagram of a client-initiated downlink dynamic load balancing (DLB) procedure in accordance with an example;

FIG. 6B illustrates a diagram of a client-initiated uplink dynamic load balancing (DLB) procedure in accordance with an example;

Figure 1A:
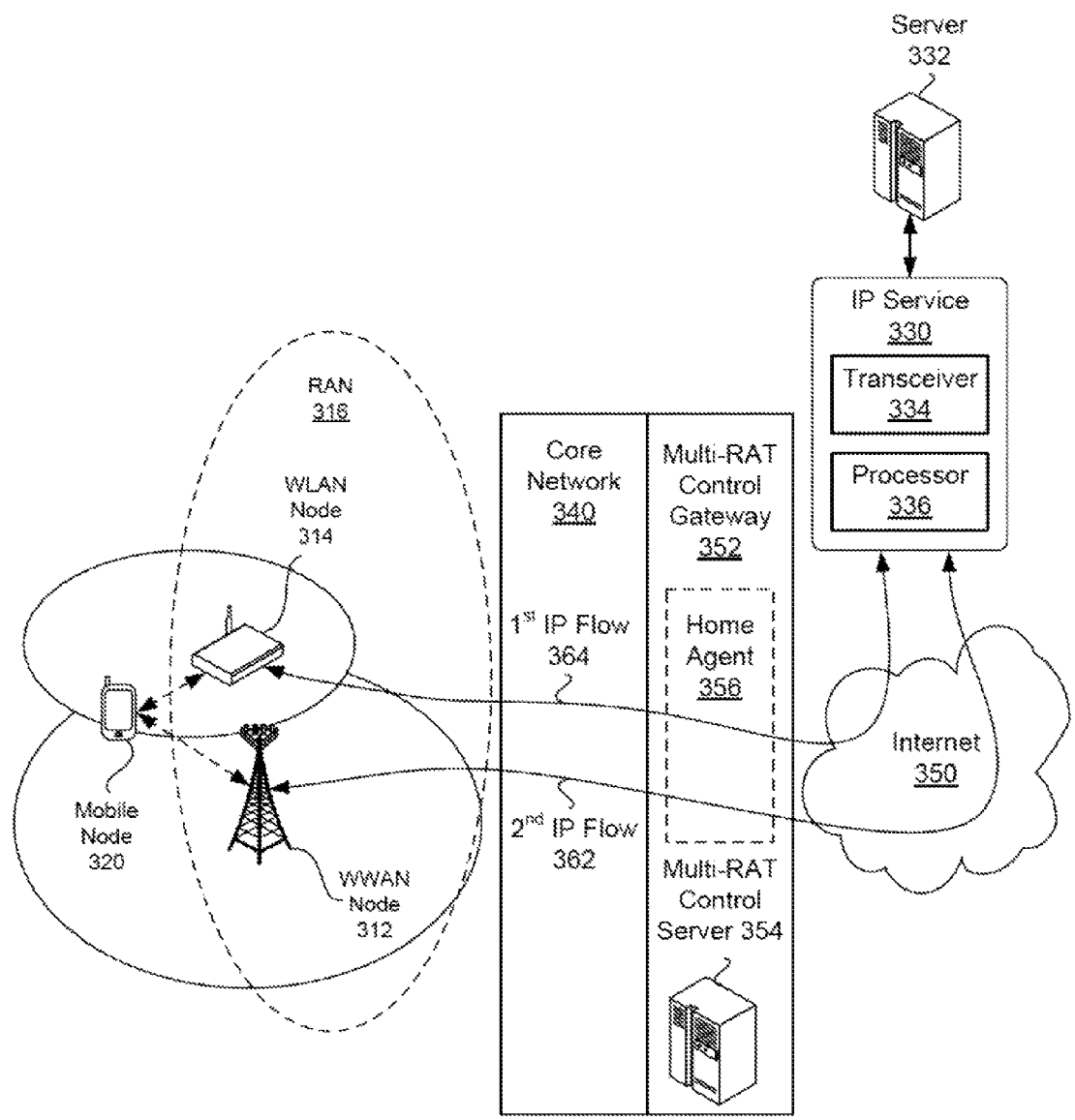
FIG. 1A illustrates a diagram of multiple network configuration with an Internet Protocol (IP) service in which a mobile node (e.g., UE) can simultaneously access a wireless local area network (WLAN) (e,g., WiFi) and a wireless wide area network (WWAN) (e.g., LTE or WiMax) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

An Internet Protocol (IP) flow mobility technique can support delivering a single IP flow over multiple networks simultaneously. As used herein, a "single IP flow" or a "single data flow" means a set of IP packets that can be classified into the same group for flow bindings based on traffic selector information, such as a source IP address, a destination IP address, a protocol type, a source port number, or a destination port number. Using a flow mobility technique to spin an individual IP flow between multiple available wireless networks can provide an enhanced user experience, such as a higher aggregate throughput.

Figure 1B:
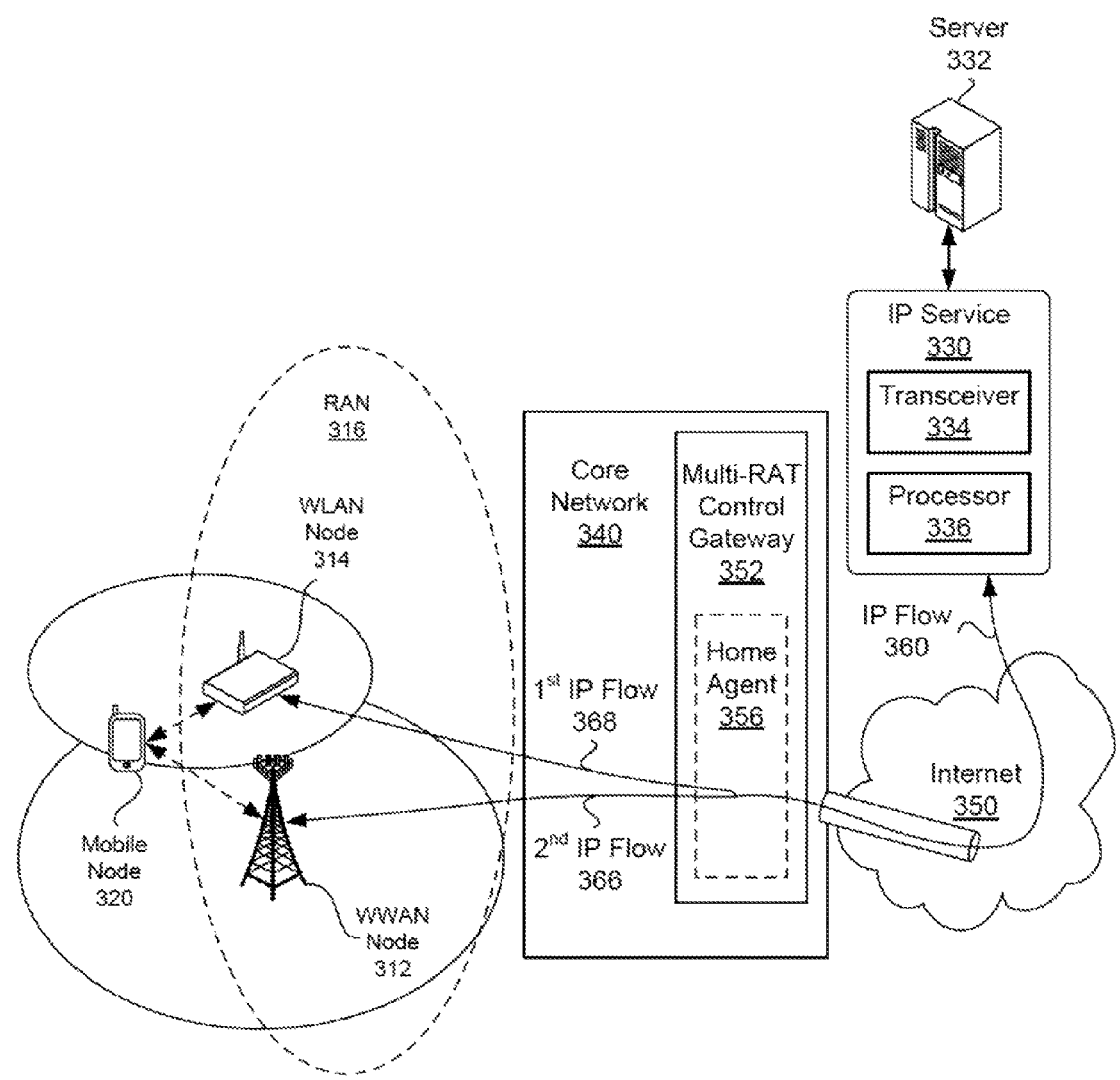
FIG. 1B illustrates another diagram of multiple network configuration with an Internet Protocol (IP) service in which a mobile node (e.g., UE) can simultaneously access a wireless local area network (WLAN) (e.g., WiFi) and a wireless wide area network (WWAN) (e.g., LTE or WiMax) in accordance with, an example.

FIG. 1A illustrates a multiple network configuration in which a mobile node (MN) 320 (e.g., mobile station (MS), subscriber station (SS), or mobile client) can simultaneously access a wireless local area network (WLAN) (e.g., Wi-Fi) via a WLAN node 314 and a wide wireless area network (WWAN) (e.g., 2G/3G cellular, LTE, or WiMAX) via a WWAN node 312, and control an IP Ultra-flow mobility. In an example, the mobile node can be simultaneously connected to an IP service 330 via the Internet 350, a WLAN, and a WWAN. A multiple radio access technology (multi-RAT) control gateway (M-RAT C-GW) 352 can be coupled between the IP service and a radio access network (RAN) 316. The RAN can include nodes for various RAT, such as Wi-Fi, 2G/3G cellular, LTE, or WiMAX. The multi-RAT control gateway can be used to route an IP flow via a tunneling layer to any of the available wireless networks (e,g., WWAN or WLAN) in the RAN. The multi-RAT control gateway can include a multi-RAT control server to process packets and provide multi-RAT control gateway functionality (e.g., multi-RAT resource control). In another example, the multi-RAT control gateway can be in communication with a core network (CN) 340, as illustrated in FIG. 1A. in another configuration, the CN can include the multi-RAT control gateway, as illustrated in FIG. 1B.

In a configuration, the IP service 330 can be coupled to a server 332. The WLAN can operate using an IEEE 802.11-based protocol. The WWAN can operate using a 3GPP-based protocol, a WiMax-based protocol, a universal mobile telecommunications system-based (UMTS-based) protocol, a code division multiple access 2000-based (CDMA2000-based) protocol, a global system for mobile communications-based (GSM-based) protocol, a cellular-digital-packet-data-based (CDPD-based) protocol, and/or a Mobitex-based protocol. Although FIGS. 1A-B illustrate two different access points to the IP services as the WLAN node and the WWAN node, other configurations may also be used, such as two or more WWAN nodes using different radio access technologies (RAT), In an example, a conventional IP flow mobility technique allows the mobile node to send a binding update message to a home agent (HA) 356, which can be included in the multi-RAT control gateway 352. In an example, the multi-RAT control gateway can be included a home core network for the mobile node 320. The HA can register multiple local IP addresses for the mobile node to a single permanent home address (i.e., HoA) at the home agent (HA). Each registered local IP address (e.g., a Care-of Address (CoA) can correspond to a particular wireless network.

In the conventional IP flow mobility technique, the mobile node can have a registered CoA1 with home agent for a first IP flow 364 (e.g., for a 3rd-party application) and a registered CoA2 for a second IP flow 362 (e.g., a Voice over Internet Protocol (VoIP) application). The first IP flow can be sent to the mobile node via the WLAN using the local IP address CoA1 and the second IP flow 2 can be sent to mobile node via the WWAN using the CoA2. Both IP flows can use the same HoA, so moving a flow from one network to another network can be completely transparent from the point of view of an IP services application.

Alternatively, the first IP flow 364 and the second IP flow 362 can represent packets from a single split IP flow from the IP service 330, as shown by FIG. 1A. Similar to switching an IP flow from one network to another, the splitting of the IP flow using at least two different networks can be transparent to the user (e.g., using the same HoA). A sequence-based flow-splitting technique to balance the load for a particular IP flow can be used to increase the end-to-end throughput. For example, a WiFi WLAN can be used to offload some or all of the WWAN traffic of the IP flow.

Each RAN connection (e.g., WiFi WAP and LTE eNB) can be referred to as a tunnel. Computer networks can use a tunneling protocol when one network protocol (i.e., the delivery protocol) encapsulates a different payload protocol. By using tunneling one network can carry a payload over an incompatible delivery-network, or provide a secure path through an untrusted network.

The technology (e.g., mobile nodes, IP services, multi-RAT control server and/or gateway, methods, computer circuitry, systems, structures, and mechanism) as described herein can support transporting a single transmission control protocol (TCP) flow (e.g., video streaming over multiple radio access networks), including managing out-of-order delivery to improve TCP performance. The single TCP flow can provide seamless Wi-Fi offload and an IP flow mobility solution using an enhanced tunneling header. The TCP flow can provide a tunneling layer (e.g., user datagram protocol (UDP) tunneling or IP-in-IP tunneling) to support and measure end-to-end (E2E or e2e) quality of service (QoS) performance. The QoS performance measurements (e.g., local measurements) made by the mobile node (e.g., client devices) can be used to make a network selection and a flow mobility decision. For example, an enhanced tunneling header and a protocol to support dynamic load balancing (DLB) with an enhanced packet re-ordering capability can provide several enhancements to the tunneling layer.

The transmission control protocol (TCP) is one of the core protocols of the Internet protocol (IP) suite. The TCP can provide reliable, ordered, error-checked delivery of a stream of octets between programs running on computers connected to a local area network (LAN), an intranet, or the public Internet. The TCP can reside at the transport layer.

User datagram protocol (UDP) is another core member of the IP suite (i.e., the set of network protocols used for the Internet). With UDP, computer applications can send messages, referred to as datagrams, to other hosts on an IP network without prior communications to set up special transmission channels or data paths.

FIG. 1A illustrates an IP service splitting an IP flow into packets for the first IP flow 364 and the second IP flow 362. FIG. 1B illustrates the multi-RAT control gateway 352 (e.g., home agent 356) splitting the IP flow 360 into packets for the first IP flow 364 and the second IP flow 362 based on various communication layers.

In computer networking and/or wireless communication, different functions can be provided by different layers in a protocol stack. The protocol stack can be in implementation of a computer networking protocol suite. The protocol stack (or protocol suite) can include the definition and implementation of the protocols. Each layer or protocol in the protocol stack can provide a specified function. The modularization of the layers and protocols can make design and evaluation of the computer networking and/or wireless communication easier. In an example, each protocol module or layer module in a stack of protocols may communicate with at least two other modules (e.g., a higher layer and a lower layer). The lowest protocol or layer can provide low-level physical interaction with the hardware. Each higher layer may add more features. The upper or topmost layers can include user applications and services.

In the LTE system, communication layers 458 (e,g., LTE layers 478) can include a physical 460 (PHY 480) (i.e., layer 1 (L1)), a data link or link 462 (i.e., layer 2 (L2)), a network 462 (i.e., layer 3 (L3)), a transport 466 (i.e., layer 4 (L4)), a session 468 (i.e., layer 5 (L5)), and an application 470 layer, as illustrated in FIG. 2. In an example, the link layer can include media access control (MAC), radio link control (RLC), packet data convergence protocol (PDCP), radio resource control (RRC) layers 482. The network layer can use an internet protocol (IP) 484, and the transport layer can use a transmission control protocol (TCP) 486 or user datagram protocol (UDP) in an internet protocol suite. In an example, the tunneling layer can occur in one of the communication layers. The session layer can use a hypertext transfer protocol (HTTP) 488. The application layer can include video, audio, speech, and timed text 494, a 3GPP file format 492, or a media presentation description (MPD) 490.

Figure 3A:
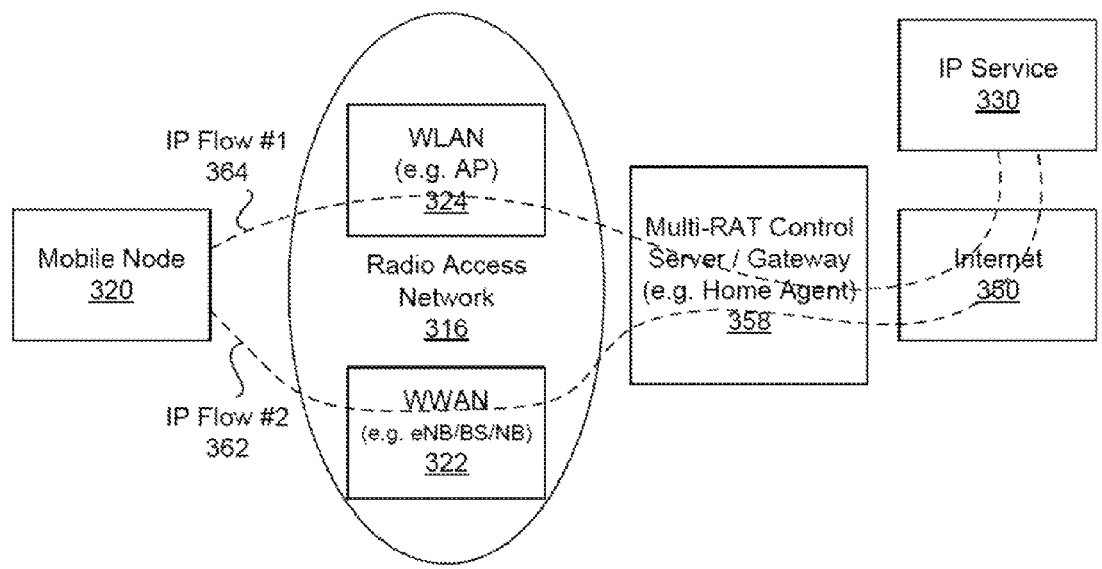
FIG. 3A illustrates diagram of multiple radio access technology (RAT) networks and a mobile node (e.g., UE) to simultaneously access a wireless local area network (WLAN) (e.g., WiFi) and a wireless wide area network (WWAN) (e.g., LTE or WiMax) via a multi-RAT control server and/or gateway (e.g., home agent) in accordance with an example.
Figure 3B:
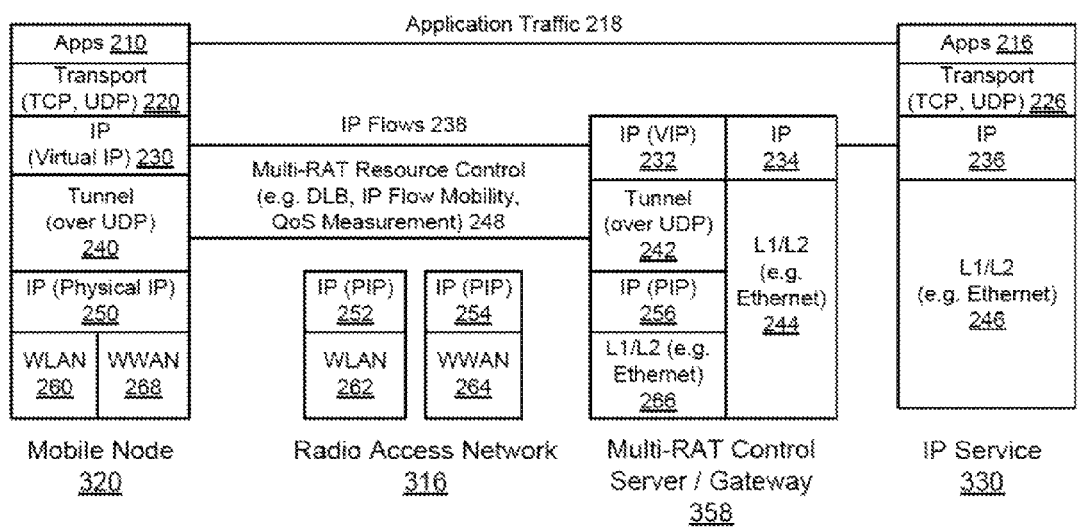
FIG. 3B illustrates a layers diagram of multiple radio access technology (RAT) networks and a Mobile node (e.g., UE) to simultaneously access a wireless local area network (WLAN) (e.g., WiFi) and a wireless wide area network (WWAN) (e.g., LTE or WiMax) via a multi-RAT control server and/or gateway (e.g., home agent) in accordance with an example.

FIG. 3A illustrates an IP flow #1 364 using a WLAN 324 (e.g., access point (AP)) and an IP flow #2 using a WWAN (e.g., NB, or BS) to communicate with the mobile node 320 from the IP service 330. FIG. 3B illustrates the communication layers for IP flow #1 and IP flow #2 from the IP service to the mobile node via a multi-RAT control server and/or gateway 358. Four communication layers are shown for the IP service, including the application layer (apps) 216, the transport layer (e.g., TCP or UDP) 226, the IP layer 236, and the L1 and/or L2 layer (e,g., Ethernet or physical layer) 246. The application layer traffic 218 and data is processed by the IP service and the mobile node, Six communication layers are illustrated at the mobile node, including the application layer (apps) 210, the transport layer (e.g., TCP or UDP) 220, the IP layer, a tunneling layer (e.g., over UDP) 240, and a L1 and/or L2 layer (e.g., physical layer for WLAN 260 and WWAN 268 signal processing). The IP layer can include a virtual IP layer 230, which provides a virtual IP address mapped to physical IP addresses used for tunneling, and a physical IP layer 250, which provides a physical address to the WWAN or WLAN in the RAN 316.

The multi-RAT control server and/or gateway 358 can provide a tunneling interface between the IP service 330 and the mobile node 320. The multi-RAT control server and/or gateway can include an IP layer (virtual IP or VIP) 232 to interface with the mobile node and an IP layer 234 to interface with the IP service, so the underlying RAT used in the transmission is transparent to the IP flows 238. In an example, the IP flow can use a HoA and/or be associated with the virtual IP layer. In another example, the multi-RAT control server and/or gateway can act as a virtual private network (VPN) for the mobile node. The multi-RAT control server and/or gateway can use the L1 and/or L2 layer (e.g., Ethernet protocol) 244 to provide physical layer communication with the IP service over a wired or optical connection. The tunnel layer (or tunneling layer) 242 can use the UDP protocol to provide multi-RAT resource control 248, such as DLB, IP flow mobility, and QoS measurements for the tunnel or RAN connections. The multi-RAT control server and/or gateway can provide the mapping of the IP flows 238 to physical IP (PIP) layer 256 addresses of access nodes (WAP, eNB, NB, or BS) of the WWAN or WLAN in the RAN. Each access node can have a PIP 252 and 254 address and L1 and/or L2 layer processing (WLAN 262 and WWAN 264) to wirelessly transmit packets to the mobile node. The physical IP (PIP) 250, 252, 254, and 256 can be associated with the tunnels. In an example, the HoA of the IP flow can be mapped to the local IP address CoA1 for the WLAN (e.g., IP flow #1) or the local IP address CoA2 for the WWAN (e.g., IP flow #2). A core network and/or the RAN can provide the L1 and/or L2 layer (e.g., Ethernet, WiFi, WiMax, or LTE protocol) 266 signaling for the access nodes. The L1 and/or L2 layer (e.g., Ethernet protocol) can be used by the multi-RAT control server and/or gateway to communicate with the RAN or the core network, Packet headers, packet formats, and packet configurations can be used to support different communication layers. For example, a packet can include an IP header (IP Hdr), a UDP header (UDP Hdr), an enhanced tunneling header, and a payload. The payload can include the message or actual data to be transmitted.

The enhanced tunneling header can support dynamic load balancing (DLB) operations as well as E2E QoS measurements. In another example, the mobile node can represent one end (e.g., receiver or transmitter) and the multi-RAT control server and/or gateway can represent another end (e.g., transmitter or receiver) in the end-to-end (E2E) QoS measurements. The enhanced tunneling header can include various parameters or bit fields, such as QoS parameters, resource management parameters, or administrative parameters. In an example, the enhanced tunneling header can include a total of four bytes. In other examples, each of the parameters of the enhanced tunneling header can have varying bit sizes. The enhanced tunneling header can have all or some of the parameters, as needed for the tunneling layer and QoS metrics.

The QoS parameter can include a data transmission (DT) time interval between a tunnel packet and a previous tunnel, packet in a tunneling flow or a sequence number (SN) of a tunnel packet of the tunneling flow. In an example, the DT field can indicate the transmission interval of a tunnel packet in units of time (e.g., millisecond (ms)), and can be used by a receiver to measure E2E delay variation. A timer in the transmitter can count the time between each tunneling packet and include the timer value in the DT field. The timer can reset after the transmitted packet or the transmission interval can be a difference between a transmitted packet and a previous packet. In another example, the DT bit field can be 7 bits long. For instance, if the actual transmission interval is greater than (>) 127 ms, the DT field can be set to a bit value of 127. The SN field can be a sequential order of the tunneling packets. The SN field can be used for re-ordering as well as packet loss measurement. In an example, the DT field can be 7 bits and the SN field can be 16 bits, The resource management parameter can include an aggregation bit field (A) to indicate when a tunnel packet includes multiple Internet Protocol (IP) data packets, a compression bit field (C) to indicate when header compression is used for an IP data packet, or a priority bit field. (P) to indicate a priority of the tunnel packet. The resource management parameter can be used to better manage the resources of the tunnel packet. Multiple packets at the transmitter (e.g., one end of the tunnel) can be combined or aggregated into a single aggregated packet to conserve header overhead. When aggregation is used the A field may be set to alert the receiver at the other tunnel that the tunnel packet includes multiple smaller packets. Compression can be used to reduce the header size. The C field indicates that compression is used on a header of the current tunnel packet and that the receiver can decompress the header to get header information. In an example, the A field and the C field can be one bit. Each packet can be given a priority to ensure minimal delays for high priority data and traffic. The P field can indicate the priority for the tunnel packet, especially when the priority in the IP header or UDP header is unavailable (e.g., due to layer header processing) or compressed. For example, a lower number or smaller number can indicate a higher priority. When 2 bits are used, 4 different priorities can be used.

The administrative parameter includes a type bit field (T) to indicate whether the tunnel packet is used for control (e.g., binding update or RRC messaging) or includes the IP data packet, a setting bit field (S) to indicate when the tunnel packet uses a different tunnel burst size (TBS) setting from a prior tunnel packet, or a flow identifier (FID) of the tunnel packet. The tunnel burst size (TBS) can be the number of consecutive packets that are sent over a RAN connection (e.g., WiFi or cellular). The administrative parameter can provide administrative information for the tunnel packet. For example, the T field can indicate if the tunnel payload carries an IP data packet (e.g., zero for data) or a control message (e.g., one for control messaging), such as a binding update (BU) message or binding acknowledgement (BA). For instance, the rest of the header fields may only be valid if T=0.

The S field can be used by the transmitter to signal the receiver that the TBS setting of a flow has changed, so that the receiver can detect out-of-order packet delivery. For example, the S field of a packet can be set to zero for one TBS setting, then when a DLB process switches or changes to a different TBS setting the S field can be set to one. With another change of the TBS setting the S field can be set back to zero, and so forth—oscillating between zero and one for each TBS setting change.

FIGS. 6A and 6B illustrate the use of the S field in a DLB process. For example, tbs(0) can represent a tunnel using a WIFi connection, and tbs(1) can represent a cellular connection (e,g., LTE or WiMAX). When tbs(0)=2, two consecutive packets of a tunnel burst can be sent on the WiFi connection before a packet is sent on the a cellular connection. When tbs(1)=2, then two consecutive packets of a tunnel burst can be sent on the cellular connection following the WiFi tunnel burst, as illustrated by packets 0-9 of FIG. 5. After each burst, the subsequent packets of the IP flow can be sent on a next connection until all the connections are used, then rotate back to the first connection. Referring back to FIGS. 6A and 6B, when the TBS setting for the IP flow is represented as tbs(0)=2 and tbs(1)=2, then the S field can equal zero (S=0). When the DLB process (e.g., used by the client) changes the TBS setting to tbs(0)=2 and tbs(1)'3then subsequent packets can include S=1 in the tunneling header (i.e., enhanced tunneling header) to indicate the change. When the DLB process again changes the TBS setting to another setting, such as tbs(0)=2 and tbs(1)=8, then the packets that follow can include S=0 in the tunneling header (e.g., switch the S field back to zero) to indicate the subsequent change. The toggling of the S field can indicate a change in the DLB.

The FID field can be used to identify which flow a packet belongs to. In an example, to limit the size of a tunnel header, the FID field can be 3 bits. As defined in the 3GPP LTE standard (Release 11), the FID can be 16 bits, For instance, a flow with FID=1 to 7 may have the SN counted separately from FID. Flows with FID greater than 7 (FIG>7) can be considered as a single flow with the FID field set to 0.

Figure 4:
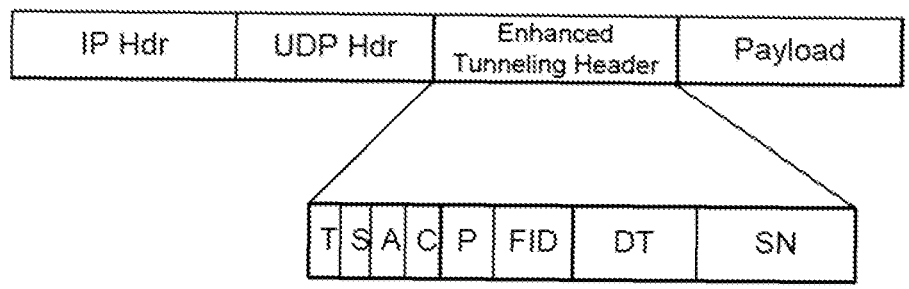
FIG. 4 illustrates a diagram of an enhanced tunneling header format in accordance with an example.

With the enhanced tunneling header including the QoS parameters as illustrated in FIG. 4, QoS metrics can be measured for an individual tunnel (or tunnel connection). Such QoS metrics can include a packet loss rate, throughput, a delay variation, a re-ordering delay, a congestion packet ratio, or an available bandwidth. The packet loss rate can be the number of packets loss from the total of number of packets sent. With the SN field, each tunnel packet can have a unique number so when SN numbers are missing, the packet loss rate can be calculated. Throughput can be the number of packets received in a period of time, such as 1 second (s).

Delay variation (or a congestion period) can be represented by DRX-DTX, where DTX indicates the time interval (e.g., delay) between two consecutive packets at the transmitter (TX) and DRX indicates the time interval (e.g., delay) between two consecutive packets at the receiver (RX). The receiver can include a timer to determine the delay. The delay variation can use the DT field and the SN field. The DTX can be determined from the DT field and the. DRX can be determined by the delay between subsequent SNs. The delay variation can be used to detect congestion and measure available bandwidth of a tunnel, and compare E2E latency between two tunnels. Based on the E2E latency, packets of the IP flow can be re-routed to the less congested tunnel connection using a DLB operation.

Re-ordering delay can measure how long a packet waits at the receiver due to out-of-order delivery. The SN field can be used determine the ordering of the packets and out-of-order delivery or reception at the receiver. The congestion packet ratio can be the number of packets that experienced congestion relative to the total number of transmitted packets. As already mentioned, the congestion packet ratio can be calculated based on the delay variation exceeding a specified (or predetermined) threshold delay or congestion threshold. The threshold delay or congestion threshold can be determined statically (e.g., a wireless standard or protocol) or dynamically based on other criteria. The available bandwidth can be the maximum. achievable throughput of a tunnel, in an example, the available bandwidth can represent a bandwidth without delay variation or a congestion period.

A decision for DLB or the flow mobility can be made by the client (e.g., mobile node) or the server (e.g., multi-RAT control server and/or gateway). The client can measure the downlink tunnel performance (e.g., using QoS metrics), and the server (e.g., IP service) can measure the uplink tunnel performance and report the QoS metrics hack to the client, where the client can make the determination of the DLB or the flow mobility. Alternatively, the sever can measure the uplink tunnel performance (e.g., using QoS metrics), and the client (e.g., IP service) can measure the uplink tunnel performance and report the QoS metrics back to the server, where the server can make the determination of the DLB or the flow mobility.

Figure 5:
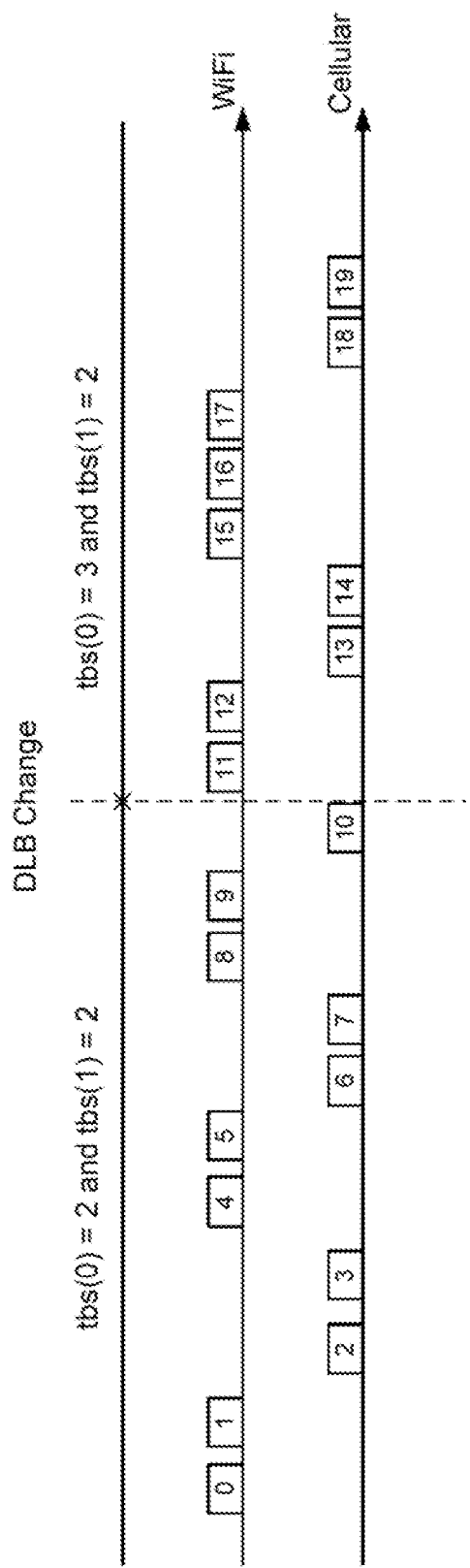
FIG. 5 illustrates a diagram of a dynamic load balancing (DLB) operation in accordance with an example.

The DLB (dynamic load balancing) control parameters can include a tunnel burst size (TBS), a maximum aggregation delay (MAD), and a re-ordering timer (ROT). The DLB control parameters can be included in control messaging (e.g., requests, responses, or acknowledgements (ACK)). The TBS can be a parameter that specifies the number of consecutive packets that are sent over a connection via a particular network (e.g., WiFi or LTE). The ROT can be parameter that specifies the maximum time that a packet may wait for at the receiver due to out-of-order delivery before a retransmission request. The ROT can specify how long the packet waits in a re-ordering buffer until prior-in-sequence packets are received. In an example, the ROT can use units in time (e.g., rot=0.5 s). The MAD can be parameter that specifies the maximum time that a packet may wait for at the transmitter due to aggregation (e.g., putting multiple small packets into a single tunnel packet to reduce tunneling overhead). In an example, the MAD can use units in time (e.g., mad=50 ms), Referring back to FIG. 5, tbs(i) can represent the TBS of the tunnel connection) where i is an integer. For instance, i=0 can represent a WiFi tunnel arid can represent a cellular (e.g., LTE or WiMax) connection. FIG. 5 shows how traffic may be split over WiFi and cellular. In this example. DLB can start with equal share loading between WiFi (i.e., tbs(0)=2) and cellular (e.g., tbs(1)=2). At packet #11 the WiFi loading ratio can increase to 60% (e,g., tbs(0)=3 and tbs(1)=2) with a DLB change.

When splitting. TCP packets over multiple RAN connections (i.e., tunnels), the receiver can re-order the packets that are delivered out-of-order. However, a packet may be lost in the tunnel due to an unreliable wireless channel or a buffer overflow.

Identifying which tunnel a missing packet is from, at the receiver, can be used to differentiate between packet loss and out-of-order delivery and minimize unnecessary re-ordering delay, For instance, if any successive packet from the same tunnel has arrived, the receiver can determine the packet is lost, assuming packets from the same tunnel will never arrive out of order. Typically packets from a particular network using a same network path will arrive in sequential order, but that order may not apply to different tunnels or different networks. For example, if packet 3 on the cellular tunnel arrives and packet 2 has not arrived. packet 2 may he considered lost, but if packet 1 has not arrived, the arrival of packet 3 may not be deterministic of a lost packet since packet 1 is transmitted using the WiFi connection, which may have additional delay over the cellular connection, The enhanced tunneling header and/or the DLB control parameters can provide additional information to differentiate between packet loss and out-of-order delivery and minimize unnecessary re-ordering delay, A deterministic tunnel burst scheduling policy can be used to determine a transmission order of packets in an IP flow into various tunnels. For example, a tunnel with smaller (or higher) binding ID (BID) can be scheduled first in each round; the minimum SN can be "0" (e.g., first packet of the first burst), which can indicate the first packet of a burst in the tunnel with the smallest BID; and the maximum SN can be given by $S_{max}=(2^L-1)$, where L can indicate the length of the SN field. BID can be an unsigned integer to uniquely identify a tunnel. The BID can be used to identify the network.

As the rule (e.g., tunnel burst scheduling policy) can be known to both transmitter and receiver, the receiver can then determine which round a missing packet is from based on the packet's SN and the current TBS settings. In another example, the rule can be known and applied by the multi-RAT control server and/or gateway.

Referring back to FIGS. 6A and 6B, a dynamic load balancing (DLB) protocol can be illustrated. FIG. 6A illustrates a client-initiated DLB procedure for a downlink, and FIG. 6B illustrates a client-initiated DEB procedure for an uplink. In a client-initiated DLB procedure for the downlink (FIG. 6A), the client (e.g., mobile node 320 (FIG. 1)) can send message to the server 332 (FIG. 1) (via the IP service 330 (FIG. 1)). For example, the message can comprise an existing binding update message as defined in Mobile IP or an RRC message used in LTE. Other message types of other wireless standards may also be used. The message can include DLB-request (DLB-REQ), which can indicate the new TBS settings for a flow identified by FID (e.g., tbs(0)=2, tbs(1)=3, mad=50 ms). The DLB-REQ can include various control parameters (e.g., TBS, ROT, or MAD). The server can then send a message in response (e.g., DLB-response (DLB-RSP)), which can include a start-SN for the DLB change. The message in response can comprise an existing binding, ACK (BA) message as defined in Mobile IP, or an RRC message used LTE.

To ensure both the client :(e.g., mobile node) and server (e.g., home agent) are synchronized about which packet a new TBS setting will start, to take effect, the server can put start-SN information in the DLR-RSP for the downlink process. The start-SN can indicate the sequence number (SN) of the first packet that will use the new TBS setting. For uplink, the client can send another DLB-REQ to include the Start-SN information after receiving the DLR-REP from the server:

In a client-initiated DLB) procedure for the uplink (FIG. 6B), the client (e.g., mobile node) can send message with the control parameters (e.g., tbs(0)=2, tbs(1)=3, rot=0.5 ms) to the server indicating a request for DLB. The client-initiated DLB procedure for the uplink can use similar messaging as the client-initiated DLB) procedure for the downlink. The server can acknowledge the change or the request in a DLB-RSP. The client can provide the start-SN for the DLB change in a DLB-REQ, and tin. server can transmit a DLB-RSP. The DLB change may be initiated with the transmission of the start-SN, even without a subsequent ACK, The DLB procedures, protocols, or processes can assist the receiver in differentiating between packet loss and out-of-order delivery and minimize unnecessary re-ordering delay. Because tunnel burst scheduling policy can be known to both transmitter and receiver, the receiver can determine when a packet is missing from a tunnel based on the packet's SN and the current TBS settings, which can be signaled using the DLB protocol. The reduction of the re-ordering delay and detemination of the packet loss can use the SN and FID parameters in the enhanced tunneling header.

Figure 7:
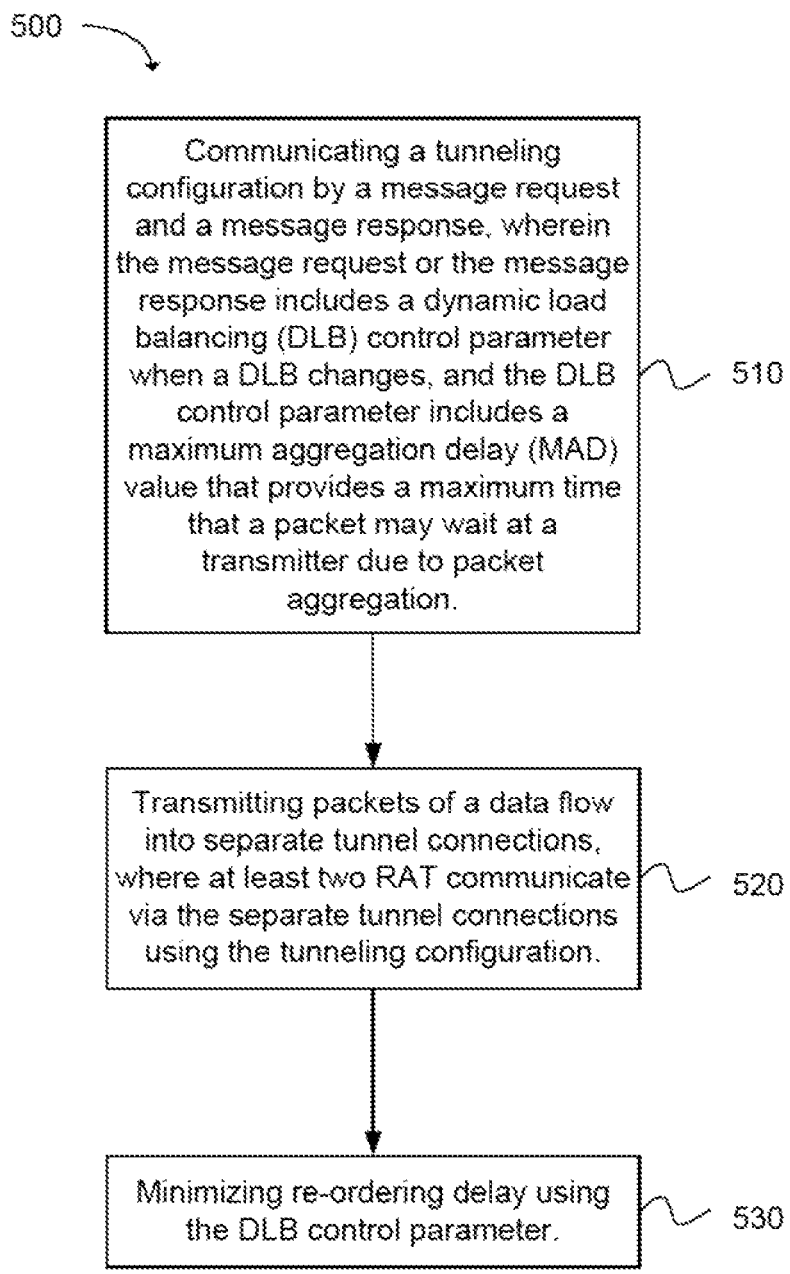
FIG. 7 depicts a flow chart of a method for ordering packets in a tunneling layer using multiple radio access technologies (RAT) in accordance with an example.

Another example provides a method 500 for ordering packets in a tunneling layer using multiple radio access technologies (RAT), as shown in the flow chart in FIG. 7. The method may be executed as instructions on a machine or computer circuitry, where the instructions are included on at least one computer readable medium or one non-transitory machine readable storage medium. The method includes the operation of communicating a tunneling, configuration by a message request and a message response, wherein the message request or the message response includes a dynamic load balancing (DLB) control parameter when a DLB changes, and the DLB control parameter includes a maximum aggregation delay (MAD) value that provides a maximum time that a packet may wait at a transmitter due to packet aggregation, as in block 510. The next operation of the method can be transmitting packets of a data flow into separate tunnel connections, wherein at least two RAT communicate via the separate tunnel connections using the tunneling configuration, as in block 520. The method can further include minimizing re-ordering delay using the DLB control parameter, as in block 530.

In an example, the DLB control parameter can include a tunnel burst size (TBS) of a number of consecutive packets that are sent over a tunnel connection, a re-ordering timer (ROT) indicating a Maximum time that a packet may wait at a receiver due to an out-of-order delivery, or a start sequence number (SN) of the packet of the flow indicating when the DLB changes. In another example, the operation of transmitting packets of the flow into separate tunnel connections can further include splitting the packets of the flow into the separate tunnel connections or receiving the packets of the flow from the separate tunnel connections.

In another configuration, the packets can use an enhanced tunneling header. The enhanced tunneling header can include a quality of service (QoS) parameter, a resource management parameter, or an administrative parameter. The QoS parameter Call include a data transmission (DT) time interval between a tunnel packet and a previous tunnel packet in a tunneling flow or a sequence number (SN) of a tunnel packet. The resource management parameter can include an aggregation bit field (A) to indicate when a tunnel packet includes multiple Internet Protocol (IP) data packets, a compression bit field (C) to indicate when header compression is used for an IP data packet, or a priority bit field (P) to indicate a priority of the tunnel packet. The administrative parameter can include as type bit field (T) to indicate whether the tunnel packet is used for control or includes the IP data packet, a setting bit field (S) to indicate when the tunnel packet uses a different tunnel burst size (TBS) setting from a prior tunnel packet, or a flow identifier (FID) of the tunnel packet. In another example, the method can further include generating a QoS metric from the QoS parameter within an enhanced tunneling header of a received packet.

In another example, the different RAT can include third generation partnership project (3GPP) long term evolution (LTE), Institute of Electrical and Electronics Engineers (IEEE) 802.16 or Worldwide interoperability for Microwave Access (WiMAX), or IEEE 802,11 or Wireless Fidelity (WiFi). In another configuration, the operation of transmitting pickets of the flow into separate tunnel connections can further include transmitting the packets in a downlink transmission from a multi-RAT control server and/or gateway (or an Internet Protocol (IP) service) to as mobile node via a base station (BS), a Node B (NB), or an evolved Node B (eNB); or transmitting the packets in an uplink transmission from the mobile node to the multi-RAT control server and/or gateway (or IP service) to the mobile node via the BS, the NB, or the eNB. The IP service can be coupled to a server. The multi-RAT control server and/or gateway can be couple between the IP service and the BS, the NB, or the eNB.

In another configuration, the method can further include scheduling the packets in tunnel bursts, where a tunnel with a smaller binding identifier (BID) is scheduled first, then a tunnel with a next smallest BID is scheduled next, and a minimum sequence number (SN) indicates a first packet of as burst in the tunnel with the smallest BID, and a maximum SN is represented by $S_{max}=(2^L-1)$ where L indicates a length of a SN bit field.

Figure 8:
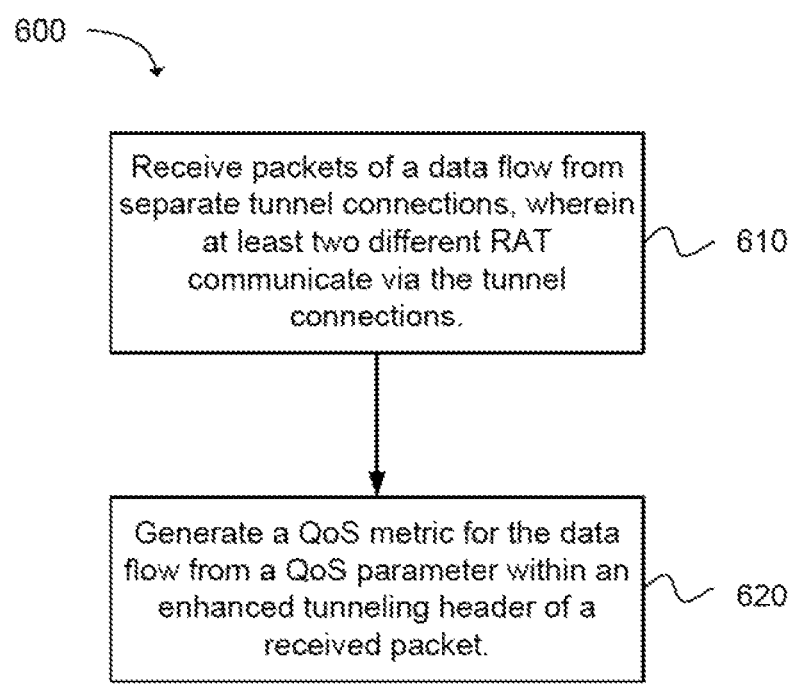
FIG. 8 depicts functionality of computer circuitry of a mobile node for measuring quality of service (QoS) in a tunneling layer using multiple radio access technologies (RAT) in accordance with an example.

Another example provides functionality 600 of computer circuitry of a mobile node for measuring quality of service (QoS) in a tunneling layer using multiple radio access technologies (RAT), as shown in the flow chart in FIG. 8. The functionality may be implemented as a method or the functionality may be executed as instructions on a machine, where the instructions are included on at least one computer readable medium or one non-transitory machine readable storage medium. The computer circuitry can be configured to receive packets of a data flow from separate tunnel connections, wherein at least two different RAT communicate via the tunnel connections, as in block 610. The computer circuitry can be further configured to generate a QoS metric for the data flow from a QoS parameter within an enhanced tunneling header of a received packet, as in block 620.

In another configuration, the computer circuitry can be configured to receive packets of a data flow from separate tunnel connections, where a RAT communicates via the tunnel connections. The computer circuitry can be further configured to generate a QoS metric for the data flow from a QoS parameter within an enhanced tunneling header of a received packet.

In an example, the QoS parameter can include a data transmission (DT) time interval between a tunnel packet and a previous tunnel packet in a tunneling flow or a sequence number (SN) of a tunnel packet.

In another example, the QoS metric can provide an end-to-end QoS performance measurement. The QoS performance measurement can include: A packet loss rate based on the SN; a delay variation based on the DT and the SN, a re-ordering delay based on the SN; a congestion packet ratio based on the delay variation; a throughput based on a number of packets received within a duration; or an available bandwidth based on the throughput and the delay variation.

In another configuration, the enhanced tunneling header can include a resource management parameter or an administrative parameter. The resource management parameter can include an aggregation bit field. (A) to indicate when a tunnel packet includes multiple Internet Protocol (IP) data packets, a compression bit field (C) to indicate when header compression is used for an IP data packet, or a priority bit field (P) to indicate a priority of the tunnel packet. The administrative parameter can include a type bit field (T) to indicate whether the tunnel packet is used for control or includes the IP data packet, a setting bit field (S) to indicate when the tunnel packet uses a different configuration. The different configuration can include a tunnel burst size (TBS) from a prior tunnel packet or a flow identifier (FID) of the tunnel packet. In another example, the different RAT can include third generation partnership project (3GPP) long term evolution (LTE), institute of Electrical and Electronics Engineers (IEEE) 802,16 or Worldwide interoperability for Microwave Access (WiMAX), or IEEE 802.11 or Wireless Fidelity (WiFi).

In another example, the computer circuitry can be further configured to determine tunnel burst scheduling of the received packets. A tunnel with smaller (or bigger) binding identifier (BID) can be scheduled first, then a tunnel with a next smallest (biggest) BID is scheduled next, and a minimum sequence number (SN) indicates a first packet of a burst in the tunnel with the smallest BID, and a maximum SN is represented by $S_{max}=(2^L-1)$ where L indicates a length of a SN bit field. In another configuration, the computer circuitry can be further configured to reorder the packets of a flow from the separate tunnel connections using the enhanced tunneling header of the received packets.

In another configuration, the computer circuitry can be further configured to: Transmit a message request to a multi-RAT control server and/or gateway to change a dynamic load balancing (DLB) between the tunnel connections based on the QoS metric; receive, during a downlink DLB process, a message response from the multi-RAT control server and/or gateway with a start sequence number (SN) of a tunnel packet of the flow indicating when the DLB changes; receive, during an uplink DLB process, a message response from the multi-RAT control server and/or gateway acknowledging the DLB change; and transmit, during the uplink DLB process, a message request to the multi-RAT control server and/or gateway with the start SN of the tunnel packet of the flow indicating when the DLB changes. For LTE, the message request can include a DLB request, and the message response includes a DLB response.

The message request and the message response use a radio resource control (RRC) message for communication using, third generation partnership project (3GPP) long term evolution (LTE). The message request can include a binding update and the message response can include a binding acknowledgement (ACK) for a mobile IP flow. The message request can include a change in a tunnel burst size (TBS) for each tunnel connection. The message request for a downlink DLB process can include a maximum aggregation delay (MAD), and the message request for an uplink DLB process can include a re-ordering timer (ROT) value.

In another configuration, the mobile node includes a user equipment (UE), a mobile station (MS), or a mobile client.

Referring back to FIG. 1, the mobile node 320 can include a transceiver and a processor. The processor and/or transceiver of the mobile node Can be configured for ordering packets in a tunneling layer using multiple radio access technologies (RAT), as described in 500 of FIG. 7. In another configuration, the processor and/or transceiver of the mobile node can be operable for measuring quality of service (QoS) in a tunneling layer using multiple radio access technologies (RAT), as described in 600 of FIG. 8.

Figure 9:
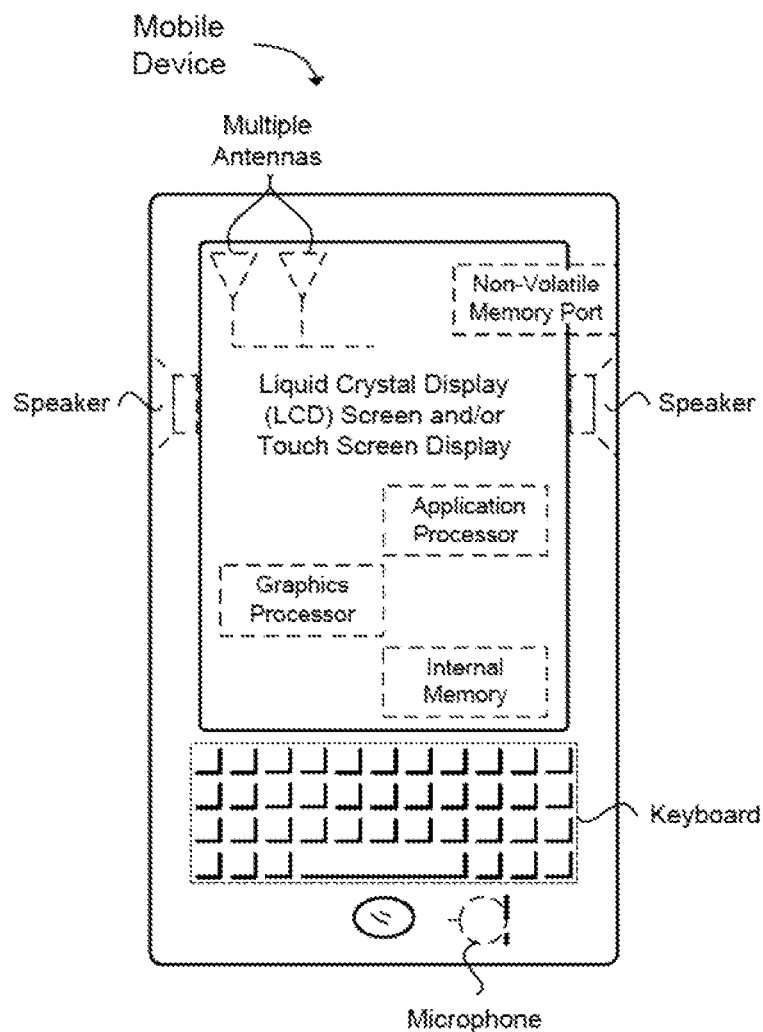
FIG. 9 illustrates a diagram of a wireless device (e.g., UE) in accordance with an example.

FIG. 9 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node (or access node or transmission station), such as a base station (BS), an evolved Node B (eNB), a Node B (NB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or WWAN.

FIG. 9 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

At a high level, network can include a core network (CN) (e.g., an evolved packet core (EPC)), and an air-interface access network E-UTRAN. The CN can be responsible for the overall control of the various user equipments (UEs) connected to the network and establishment of the bearers. The CN may include functional entities, such as a multi-RAT control gateway, a home agent (HA), and/or an access network discovery and selection function (ANDSF) server or entity. The E-UTRAN can be responsible for radio-related functions.

Some main logical nodes of the CN can include a serving gateway general packet radio service (GPRS) support node (GGSN), a mobility management entity (AME), a home subscriber server (HSS), a serving gateway (SGW or S-GW), a packet data network (PDN) gateway, and a policy and charging rules function (PCRF) manager. Each of the network elements of CN can interconnected by well-known standardized interfaces, such as interfaces S3, S4, or S5.

Referring back to FIGS. 1A-B, the Internet Protocol (IP) service 330 can include a transceiver 334 and a processor 336. In another example, the multi-RAT control gateway 352 can include a transceiver and a processor. The multi-RAT control gateway can be configured for providing quality of service (QoS) parameters in an enhanced tunneling header. In an example, the transceiver and the processor functionality applicable to the multi-RAT control gateway can he applicable to the IP service. The processor can be configured for splitting packets of a data flow into separate tunnel connections. At least two different RAT (e.g., WiFi, WiMAX, or LTE) can communicate via the tunnel connections. The transceiver can be configured to: transmit a downlink packet with the enhanced tunneling header using one of the tunnel connections to a mobile node during a downlink transmission, and receive an uplink packet with the enhanced tunneling header using one of the tunnel connections from the mobile node during an uplink transmission. The enhanced tunneling header can include a QoS parameter.

In another configuration, the QoS parameter can include a data transmission (DT) time interval between a tunnel packet and a previous tunnel packet in a tunneling flow or a sequence number (SN) of a tunnel packet. The enhanced tunneling header can include a resource management parameter and an administrative parameter. The resource management parameter can include an aggregation bit field (A) to indicate when a tunnel packet includes multiple Internet Protocol IP) data packets, a compression bit field (C) to indicate when header compression is used for an IP data packet, or a priority bit field (P) to indicate a priority of the tunnel packet. The administrative parameter can include a type bit field (T) to indicate whether the tunnel packet is used for control or includes the IP data packet, a setting bit field (S) to indicate when the tunnel packet uses a different tunnel burst size (TBS) setting from a prior tunnel packet, or a flow identifier (FID) of the tunnel packet. The different RAT can include third generation partnership protect (3GPP) long term evolution (LTE), Institute of Electrical and Electronics Engineers (IEEE) 802.16 or Worldwide interoperability for Microwave Access (WiMAX), or IEEE 802.11 or Wireless Fidelity (WiFi).

In another example, the processor can be further configured to schedule packets in tunnel busts for the separate tunnel connections. A tunnel with smaller (or bigger) binding identifier (BID) can be scheduled first, then a tunnel with a next smallest BID can be scheduled next. A minimum sequence number (SN) can indicate a first packet of a burst in the tunnel with the smallest BID. A maximum SN can be represented by $S_{max}=(2^L-1)$ where L indicates a length of a SN bit field.

In another configuration, the transceiver can be further configured to communicate a tunneling configuration by a message request and a message response. The message request or the message response can include a start sequence number (SN) of a tunnel packet of the flow indicating when a dynamic load balancing (DLB) changes. The message request can include a DLB request, and the message response includes a DLB response. The message request and the message response can use radio resource control (RRC) message for third generation partnership project (3GPP) long term evolution (LTE). In another example, the message request can include a binding update and the message response can include a binding acknowledgement (ACK) for a mobile IP flow. The message request can include a DLB control parameter having a tunnel burst size (TBS), a re-ordering timer (ROT), or a maximum aggregation delay (MAD).

The multi-RAT control gateway 352 can be coupled to a server 354 and can communicate with the mobile node 320 is a base station (BS), a Node B (NB), an evolved Node B (eNB), a baseband Unit (BBU). remote radio head (RRH), a remote radio equipment (RRE), a remote radio unit (RRU), a central processing module (CPM), a WLAN node 314, or a WWAN node 312.

Various techniques, or certain aspects or portions thereof, may take the form of program code (i.e., instructions) embodied in tangible media, such as floppy diskettes, compact disc-read-p.m.;only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device, The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the. program(s) may be implemented in assembly or machine language, if desired. In any case, the language may be a compiled or interpreted language, and combined with hardware implementations.

It should be understood that many of the functional units described in this specification have been labeled modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A mobile node for measuring quality of service (QoS) in a tunneling layer using multiple radio access technologies (RAT), having computer circuitry configured to:
   receive packets of a data flow from separate tunnel connections, wherein a RAT communicates via the tunnel connections; and
   generate a QoS metric for the data flow from a QoS parameter within an enhanced tunneling header of a received packet
   transmit a message request to an multi-RAT control gateway to change a dynamic load balancing (DLB) between the tunnel connections based on the QoS metric;
   receive, during a downlink DLB process, a message response from the multi-RAT control gateway with a start sequence number (SN) of a tunnel packet of the flow indicating when the DLB changes;
   receive, during an uplink DLB process, a message response from the multi-RAT control gateway acknowledging the DLB change; and
   transmit, during the uplink DLB process, a message request to the multi-RAT control gateway with the start SN of the tunnel packet of the flow indicating when the DLB changes.

2. The computer circuitry of claim 1, wherein the QoS parameter includes a data transmission (DT) time interval between a tunnel packet and a previous tunnel packet in a tunneling flow or a sequence number (SN) of a tunnel packet.

3. The computer circuitry of claim 2, wherein the QoS metric provides an end-to-end QoS performance measurement including:
   a packet loss rate based on the SN;
   a delay variation based on the DT and the SN;
   a re-ordering delay based on the SN;
   a congestion packet ratio based on the delay variation;
   a throughput based on a number of packets received within a duration; or
   an available bandwidth based on the throughput and the delay variation.

4. The computer circuitry of claim 1, wherein the enhanced tunneling header includes a resource management parameter or an administrative parameter, wherein the resource management parameter includes an aggregation bit field (A) to indicate when a tunnel packet includes multiple Internet Protocol (IP) data packets, a compression bit field (C) to indicate when header compression is used for an IP data packet, or a priority bit field (P) to indicate a priority of the tunnel packet, and wherein the administrative parameter includes a type bit field (T) to indicate whether the tunnel packet is used for control or includes the IP data packet, a setting bit field (S) to indicate when the tunnel packet uses a different configuration, and the different configuration includes a tunnel burst size (TBS) from a prior tunnel packet or a flow identifier (FID) of the tunnel packet.

5. The computer circuitry of claim 1, wherein the different RAT include third generation partnership project (3GPP) long term evolution (LTE), Institute of Electrical and Electronics Engineers (IEEE) 802.16 or Worldwide interoperability for Microwave Access (WiMAX), or IEEE 802.11 or Wireless Fidelity (WiFi).

6. The computer circuitry of claim 1, wherein the computer circuitry is further configured to:
   determine tunnel burst scheduling of the received packets, wherein a tunnel with smaller binding identifier (BID) is scheduled first, then a tunnel with a next smallest BID is scheduled next, and a minimum sequence number (SN) indicates a first packet of a burst in the tunnel with the smallest BID, and a maximum SN is represented by $S_{max}=(2^L-1)$ where L indicates a length of a SN bit field.

7. The computer circuitry of claim 1, wherein the computer circuitry is further configured to:
   reorder the packets of a flow from the separate tunnel connections using the enhanced tunneling header of the received packets.

8. The computer circuitry of claim 1, wherein:
   the message request includes a DLB request, and the message response includes a DLB response; and the message request and the message response use a radio resource control (RRC) message for communication using third generation partnership project (3GPP) long term evolution (LTE); and
   the message request includes a binding update and the message response includes a binding acknowledgement (ACK) for a mobile IP flow.

9. The computer circuitry of claim 1, wherein the message request includes a change in a tunnel burst size (TBS) for each tunnel connection, and the message request for a downlink DLB process includes a maximum aggregation delay (MAD), and the message request for an uplink DLB process includes a re-ordering timer (ROT) value.

10. The computer circuitry of claim 1, wherein the mobile node includes a user equipment (UE), a mobile station (MS), or a mobile client, and the mobile node includes an antenna, a touch sensitive display screen, a speaker, a microphone, a graphics processor, an application processor, internal memory, or a non-volatile memory port.

11. A method for ordering packets in a tunneling layer using multiple radio access technologies (RAT), comprising:
    communicating a tunneling configuration by a message request and a message response, wherein the message request or the message response includes a dynamic load balancing (DLB) control parameter when a DLB changes, and the DLB control parameter includes a maximum aggregation delay (MAD) value that provides a maximum time that a packet may wait at a transmitter due to packet aggregation;
    transmitting packets of a data flow into separate tunnel connections, wherein at least two RAT communicate via the separate tunnel connections using the tunneling configuration; and
    minimizing re-ordering delay using the DLB control parameter.

12. The method of claim 11, wherein the DLB control parameter includes a tunnel burst size (TB S) of a number of consecutive packets that are sent over a tunnel connection, a re-ordering timer (ROT) indicating a maximum time that a packet may wait at a receiver due to an out-of-order delivery, or a start sequence number (SN) of the packet of the flow indicating when the DLB changes.

13. The method of claim 11, wherein transmitting packets of the flow into separate tunnel connections further comprises splitting the packets of the flow into the separate tunnel connections or receiving the packets of the flow from the separate tunnel connections.

14. The method of claim 11, wherein the packets use an enhanced tunneling header and the enhanced tunneling header includes a quality of service (QoS) parameter, a resource management parameter, or an administrative parameter, and wherein the QoS parameter includes a data transmission (DT) time interval between a tunnel packet and a previous tunnel packet in a tunneling flow or a sequence number (SN) of a tunnel packet, and wherein the resource management parameter includes an aggregation bit field (A) to indicate when a tunnel packet includes multiple Internet Protocol (IP) data packets, a compression bit field (C) to indicate when header compression is used for an IP data packet, or a priority bit field (P) to indicate a priority of the tunnel packet, and wherein the administrative parameter includes a type bit field (T) to indicate whether the tunnel packet is used for control or includes the IP data packet, a setting bit field (S) to indicate when the tunnel packet uses a different tunnel burst size (TBS) setting from a prior tunnel packet, or a flow identifier (FID) of the tunnel packet.

15. The method of claim 14, further comprising:
generating a QoS metric from the QoS parameter within an enhanced tunneling header of a received packet.

16. The method of claim 11, wherein the different RAT include third generation partnership project (3GPP) long term evolution (LTE), Institute of Electrical and Electronics Engineers (IEEE) 802.16 or Worldwide interoperability for Microwave Access (WiMAX), or IEEE 802.11 or Wireless Fidelity (WiFi).

17. The method of claim 11, wherein transmitting packets of the flow into separate tunnel connections further comprises:
transmitting the packets in a downlink transmission from a multi-RAT control gateway to a mobile node via a base station (BS), a Node B (NB), or an evolved Node B (eNB); or
transmitting the packets in an uplink transmission from the mobile node to the multi-RAT control gateway to the mobile node via the BS, the NB, or the eNB,
wherein the multi-RAT control gateway is coupled to a server.

18. The method of claim 11, further comprising:
scheduling the packets in tunnel bursts, wherein a tunnel with a smaller binding identifier (BID) is scheduled first, then a tunnel with a next smallest BID is scheduled next, and a minimum sequence number (SN) indicates a first packet of a burst in the tunnel with the smallest BID, and a maximum SN is represented by $S_{max}=(2^L-1)$ where L indicates a length of a SN bit field.

19. At least one non-transitory machine readable storage medium comprising a plurality of instructions adapted to be executed to implement the method of claim 11.

20. A multiple radio access technologies (multi-RAT) control gateway for providing quality of service (QoS) parameters in an enhanced tunneling header, comprising:
a processor for splitting packets of a data flow into separate tunnel connections, where at least two different RAT communicate via the tunnel connections; and
a transceiver to:
transmit a downlink packet with the enhanced tunneling header using one of the tunnel connections to a mobile node during a downlink transmission, and
receive an uplink packet with the enhanced tunneling header using one of the tunnel connections from the mobile node during an uplink transmission, wherein the enhanced tunneling header includes a QoS parameter;
the processor is further configured to schedule packets in tunnel bursts for the separate tunnel connections, wherein a tunnel with smaller binding identifier (BID) is scheduled first, then a tunnel with a next smallest BID is scheduled next, and a minimum sequence number (SN) indicates a first packet of a burst in the tunnel with the smallest BID, and a maximum SN is represented by $S_{max}=(2^L-1)$ where L indicates a length of a SN bit field.

21. The multi-RAT control gateway of claim 20, wherein the QoS parameter includes a data transmission (DT) time interval between a tunnel packet and a previous tunnel packet in a tunneling flow or a sequence number (SN) of a tunnel packet.

22. The multi-RAT control gateway of claim 20, wherein the enhanced tunneling header includes a resource management parameter and an administrative parameter, wherein the resource management parameter includes an aggregation bit field (A) to indicate when a tunnel packet includes multiple Internet Protocol (IP) data packets, a compression bit field (C) to indicate when header compression is used for an IP data packet, or a priority bit field (P) to indicate a priority of the tunnel packet, and wherein the administrative parameter includes a type bit field (T) to indicate whether the tunnel packet is used for control or includes the IP data packet, a setting bit field (S) to indicate when the tunnel packet uses a different tunnel burst size (TBS) setting from a prior tunnel packet, or a flow identifier (FID) of the tunnel packet.

23. The multi-RAT control gateway of claim 20, wherein the different RAT include third generation partnership project (3GPP) long term evolution (LTE), Institute of Electrical and Electronics Engineers (IEEE) 802.16 or Worldwide interoperability for Microwave Access (WiMAX), or IEEE 802.11 or Wireless Fidelity (WiFi).

24. The multi-RAT control gateway of claim 20, wherein the transceiver is further configured to communicate a tunneling configuration by a message request and a message response, wherein the message request or the message response includes a start sequence number (SN) of a tunnel packet of the flow indicating when a dynamic load balancing (DLB) changes.

25. The multi-RAT control gateway of claim 24, wherein:
the message request includes a DLB request, and the message response includes a DLB response; and the message request and the message response use radio resource control (RRC) message for third generation partnership project (3GPP) long term evolution (LTE); and
the message request includes a binding update and the message response includes a binding acknowledgement (ACK) for a mobile IP flow.

26. The multi-RAT control gateway of claim 24, wherein the message request includes a DLB control parameter having a tunnel burst size (TBS), a re-ordering timer (ROT), or a maximum aggregation delay (MAD).

27. The multi-RAT control gateway of claim 20, wherein the multi-RAT control gateway is coupled to a server and communicates with the mobile node via a base station (BS), a Node B (NB), an evolved Node B (eNB), a baseband unit (BBU), a remote radio head (RRH), a remote radio equipment (RRE), a remote radio unit (RRU), or a central processing module (CPM).

* * * * *